United States Patent [19]

Kolosko et al.

[11] 4,000,906
[45] Jan. 4, 1977

[54] TWO-SPEED AUTOMATIC PHONOGRAPH

[75] Inventors: Leon F. Kolosko, Cheektowaga; Alvin S. Topolski, Tonawanda, both of N.Y.

[73] Assignee: The Wurlitzer Company, Chicago, Ill.

[22] Filed: Apr. 18, 1975

[21] Appl. No.: 569,213

[52] U.S. Cl. .............................. 274/9 A; 274/39 A; 318/166; 318/168; 318/171
[51] Int. Cl.² .................................... G11B 25/04
[58] Field of Search .............. 274/9 A, 1 EE, 39 A; 318/171, 168, 166

[56] References Cited
UNITED STATES PATENTS

| | | | |
|---|---|---|---|
| 2,505,630 | 4/1950 | Weathers | 274/1 F |
| 2,885,208 | 5/1959 | Pranter | 274/9 A |
| 3,193,296 | 7/1965 | Rockola | 274/9 A |
| 3,416,057 | 12/1968 | Froyd et al. | 318/171 |
| 3,463,986 | 8/1969 | Curriston et al. | 318/166 |
| 3,485,499 | 12/1969 | Fukuda | 274/9 A |
| 3,599,984 | 8/1971 | Kondo | 274/1 L |
| 3,814,442 | 6/1974 | Van Antwerp | 274/39 A |
| 3,819,992 | 6/1974 | Opal et al. | 318/171 |

FOREIGN PATENTS OR APPLICATIONS

| | | | |
|---|---|---|---|
| 299,003 | 5/1971 | U.S.S.R. | 318/166 |

OTHER PUBLICATIONS

"Electronic Drive" Radio–Electronics p. 56.

*Primary Examiner*—Richard E. Aegerter
*Assistant Examiner*—John W. Shepperd
*Attorney, Agent, or Firm*—Olson, Trexler, Wolters, Bushnell & Fosse, Ltd.

[57] ABSTRACT

A two-speed automatic phonograph has a self-resetting, record-centering pilot to receive records having different size apertures therein. The records of different size apertures are to be operated at different playing speeds for reproduction of the sound tracks thereon. The speed at which the record is turned, i.e. 33⅓ rpm or 45 rpm, is automatically controlled by sensing a characteristic of the record to be played. This will vary the frequency of a signal source which controls the speed of rotation of a synchronous motor which drives the record turntable at the proper playing speed. Also, the motor drive circuit includes means for applying a high voltage to the motor during startup thereof and for reducing the voltage applied to the motor during normal running while a record is being played.

7 Claims, 9 Drawing Figures

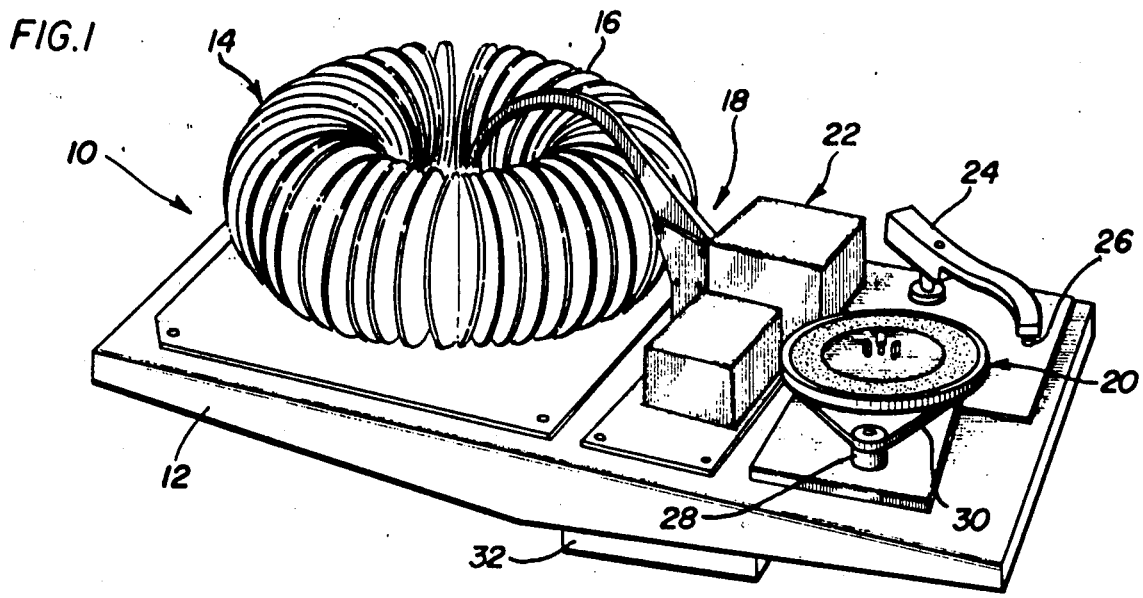
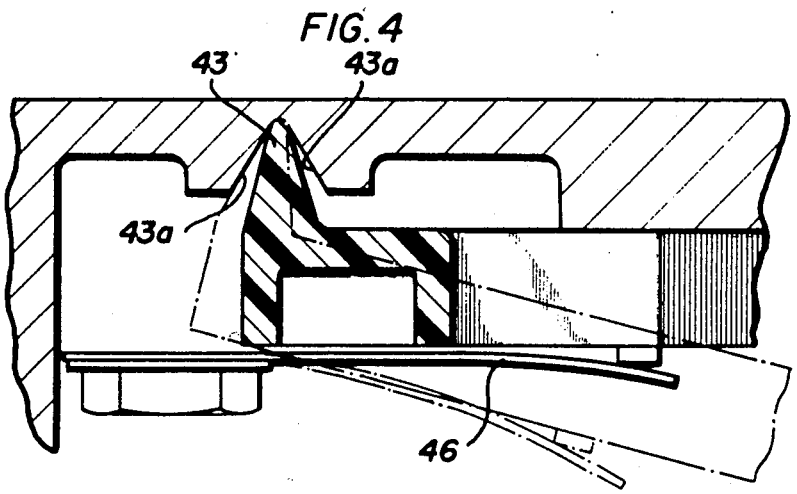
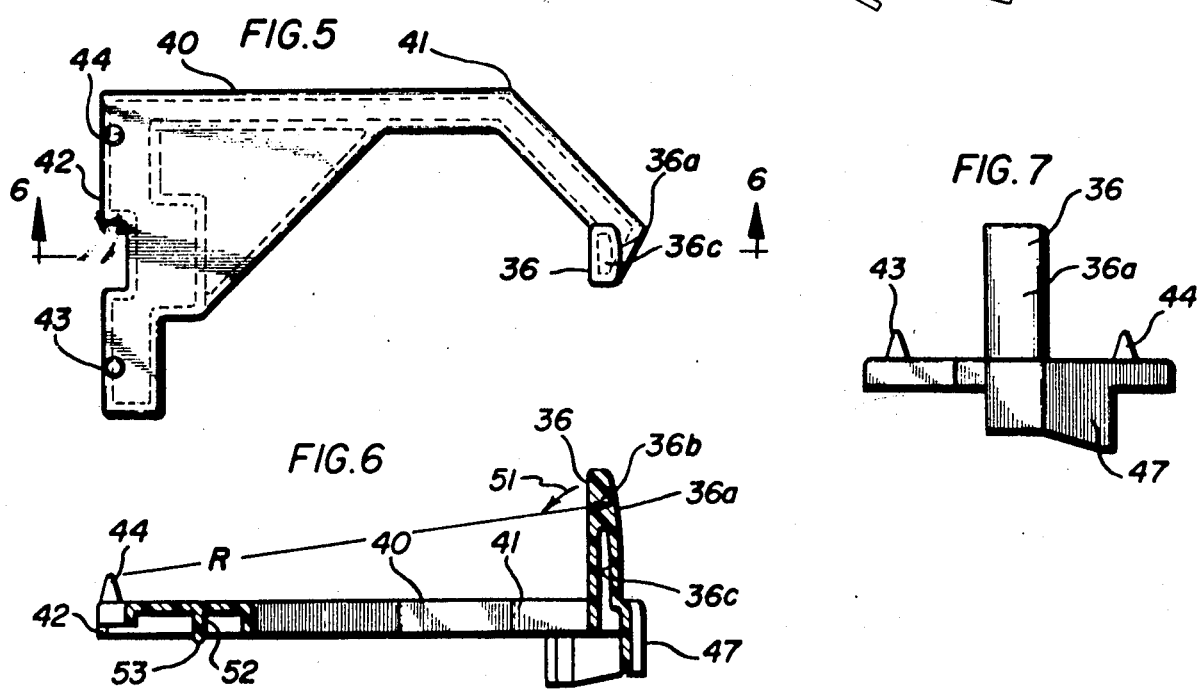

TWO-SPEED AUTOMATIC PHONOGRAPH

BACKGROUND OF THE INVENTION

This invention relates to the art of reproducing phonograph records, and more particularly, to an automatic two-speed changing device for playing records designed to be reproduced at different speeds of rotation.

Coin-operated phonographs, commonly referred to as "juke boxes", for some years have been designed to reproduce or play records designed for rotation at a single speed such as 45 rpm. These records are 7 inches in diameter and they have a relatively large center hole of approximately 1½ inches. However, recently records of similar size have been produced to be played at 33⅓ rpm, these records commonly being referred to in the art as "little LPs". These little LPs have small center holes and are thereby readily distinguished by their appearance from the 45 rpm records. It is often desired to place both 33⅓ and 45 rpm records in a juke box for reproduction alternately. It is known that the different size center holes can be used to control speed devices to change the speed of the records. Such devices are disclosed in the patents to Osborne U.S. Pat. Nos. 2,673,089 and 2,851,273.

In general, the prior art approach of changing the speed of rotation of intermingled 45 and 33⅓ rpm records is rather complex and expensive. Many prior art devices incorporate lock, trip and release mechanisms to change the mechanical coupling ratio between the drive motor and the turntable. This is done either by changing the ratio of pulleys or by changing drive wheel diameters as is wellknown in the art.

Two basic problems are inherent with prior art devices. First, the 45 rpm pilot assembly must be reset between record plays. Presently, a trip mechanism removes a support member from beneath the 45 rpm pilot and the pilot falls out of the way by gravity. The 45 rpm pilot then must be reset before it can accept a 45 rpm record. Secondly, the pilots must be designed to accept records which have diameters that can vary as much as 1/16 inch undersize from the normal record hole dimension and further enable the record to be placed in a playing position without the possibility of bending or cracking the record. Furthermore, records which have holes larger than the desired dimension must be accurately centered to eliminate or minimize the "wow" which may develop during playing.

Accordingly, it is an object of this invention to provide a new and improved two-speed automatic phonograph which overcomes the problems of the prior art by providing means for receiving records having different hole dimensions and centering the record properly.

Still another object of this invention is to provide a two-speed automatic phonograph which eliminates the need for mechanical speed-changing devices.

Another object of this invention is to provide a two-speed phonograph which includes means for sensing the characteristic of the record being played, i.e. either 33⅓ rpm or 45 rpm, and automatically resetting itself after being set by one of the records.

Still another object of this invention is to provide a new and improved two-speed phonograph which has improved starting torque characteristics and reduced "hum" and "wow" during playing of records.

Briefly, the present invention provides a new centering structure which has substantially improved operating characteristics and which is relatively inexpensive to manufacture. The record-centering structure utilizes the ability of a pivoted arm to resist extremely high forces applied radially toward its pivot point, yet will yield relatively easily to extremely low forces applied tangentially to its pivot point. The centering mechanism incorporates three record guides which are positioned in the center portion of a turntable and arcuately spaced apart from one another 120°. Each of the guides includes an arm portion extending therefrom and pivot means formed on the arm portion to be pivotally secured beneath the turntable. In the illustrated embodiment, the pivot is formed by two 0.015 inch diameter spherical portions formed on conical protuberances which fit into correspondingly shaped sockets. This enables the guide to rotate about its pivot point. Spring pressure is exerted to hold the guide in a position to receive a 45 rpm record. However, when a record of the 33⅓ rpm type is applied to the turntable, the weight of the record will push down on the guide causing it to pivot about its pivot point and allow the record to rest upon a smaller diameter spindle for centering.

The automatic phonograph of this invention also includes means for providing a high starting voltage to a drive motor to generate starting torque and thereafter reduces the voltage to the drive motor during normal running speed. This reduced voltage also reduces the "hum" and "wow" characteristics often encountered in phonograph apparatus of the type disclosed herein. Preferably, a synchronous motor is utilized as a drive motor and is operated to provide the appropriate playing speed of the record by controlling the synchronous motor with an AC signal of predetermined frequency. To change the speed of the motor, the frequency of the AC signal is changed. This is accomplished, in the illustrated embodiment, automatically by providing a light responsive sensing circuit which controls the operation of an oscillator which, in turn, controls the speed of rotation of the synchronous motor.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective view of a two-speed phonograph structure constructed in accordance with the principles of this invention and which can be used in conjunction with the coin-operated juke boxes and the like;

FIG. 4 is enlarged fragmentary detailed view showing the conical protuberance pivotal arrangement of this invention;

FIG. 5 is a top view of one of the guide elements used for centering 45 rpm records;

FIG. 6 is a side view of the guide element of FIG. 5;

FIG. 7 is an end view of the guide element of FIGS. 5 and 6;

DETAILED DESCRIPTION OF THE EMBODIMENT

Figure 2:
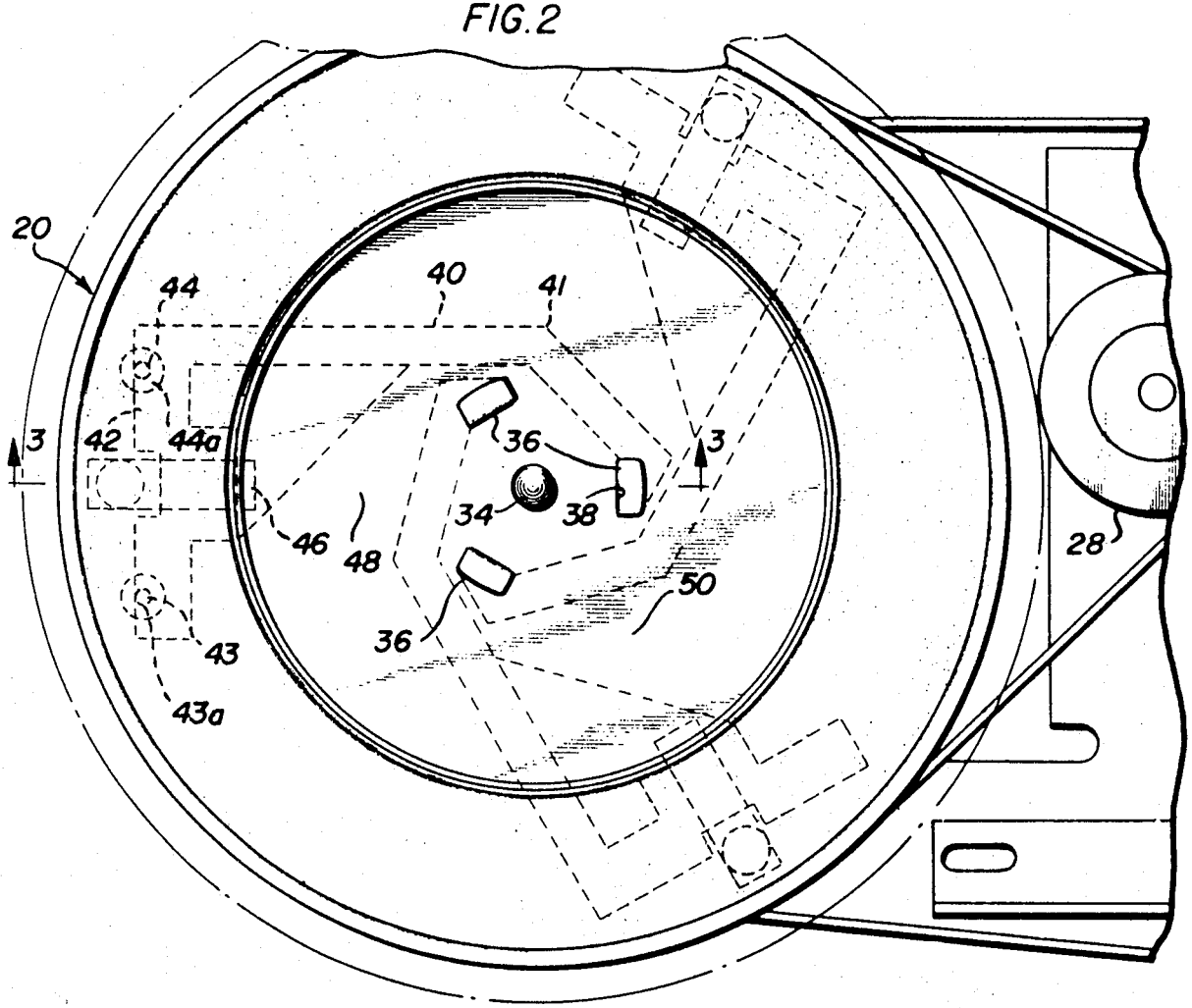
FIG. 2 is a detailed plan view of the turntable mechanism constructed in accordance with this invention and utilized in the record player of FIG. 1.
Figure 3:
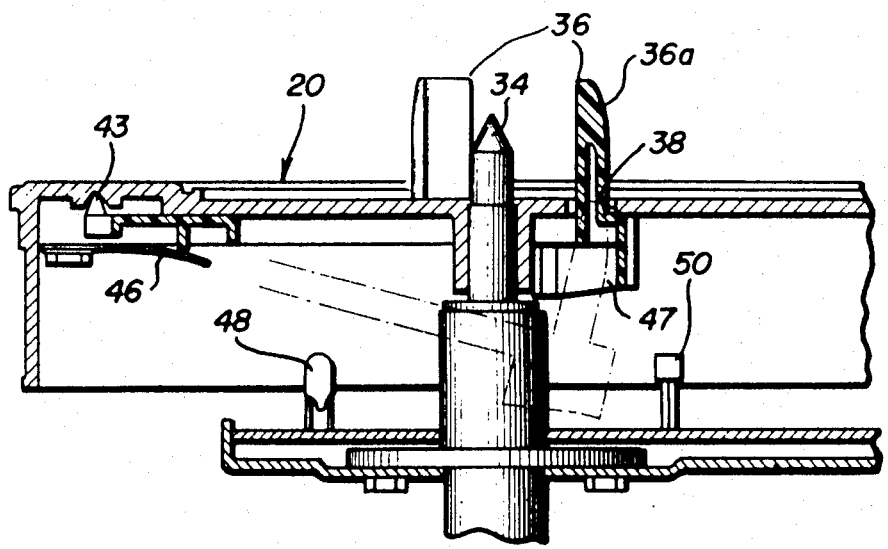
FIG. 3 is a sectional view taken along line 3—3 of FIG. 2.

Referring now to FIG. 1 there is seen a two-speed automatic phonograph assembly constructed in accordance with the principles of this invention and designated generally by reference numeral 10. While the particular structural configuration illustrated herein is presented for illustrating the utility of the present invention, it will be understood that other configurations of a two-speed automatic phonograph can be incorporated. For example, phonograph structures wherein a plurality of records are stacked vertically can be used as well. The actual changing mechanism for applying records to the turntable does not form part of the present invention, but will be illustrated to better understand the operation of the invention.

The record changer assembly 10 is intended for mounting on a base or support frame 12 for use in an automatic phonograph of the juke box type. The record changer assembly 10 includes a record magazine or basket 14 for holding a plurality of records 16 in a generally toroidal relationship relative to the support frame 12. The records 16 are removed from the record magazine 14 by a record transfer and positioning assembly or mechanism 18. The record transfer mechanism 18 engages a selected record 16 in the record magazine 14 and transfers the record from the magazine to a turntable 20. Here the turntable 20 is shown mounted on the support frame 12, however, it will be understood that the turntable 20 may be positioned above or below the support table and thereby requiring separate support means for the magazine and the turntable. The movement of the record transfer mechanism 18 relative to the turntable 20 is controlled by a drive and control mechanism designated generally by reference numeral 22, which is also mounted on the support base 12. A tone arm or pickup arm 24 is secured to the support base 12 for engaging a groove in the record with a needle assembly 26 in a conventional and well-known manner for reproduction of the sound track on the record.

In accordance with the principles of the present invention, the turntable 20 is driven by a two-speed drive motor 28 coupled to the turntable 20 by means of a drive belt 30. While the drive belt 30 is illustrated herein, it will be understood that the advantages of the present invention enable the motor to be directly coupled to a shaft extending downwardly from the turntable 20, thereby eliminating the need of belts. Mounted beneath the support 12 is a control cabinet or housing 32 wherein the control circuitry necessary for operation of the two-speed automatic phonograph may be contained.

For a better understanding of details of one aspect of the present invention, reference is now made to FIGS. 2, 3, 4, 5, 6 and 7, which illustrate certain structural aspects of the present invention. The turntable 20 has a centering pin 34 located at the axis of rotation of the turntable for receiving records having a relatively small aperture formed therein, for example records of the 33⅓ rpm type. A plurality of upwardly directly, downwardly movable guides 36 are spaced 120° apart from one another on a common radius and extend through apertures 38 formed in the turntable 20. The guides 36 are so arranged to receive a relatively large diameter hole formed in 45 rpm records and automatically center the record as it slides along the arcuate outer faces 36a thereof. It is more probable that the guides 36 will rotate down as they center the record instead of having the record slide down them. They will work either way. Note surface 36a is all at a distance R in FIG. 6 through its full angle. Even so a record approaching guides 36 from the top (as shown in FIG. 2) will see a reduced diameter for engagement. It is necessary for the distance between the record center and the transfer arm pivot to be several times longer than the R distance on guides 36.

In the illustrated embodiment the guides 36 are secured to arm portions 40 each of which has a bend or elbow 41 located intermediate the ends thereof. As all of the guides and arms are substantially identical in configuration only one will be described in detail. The arm 40 has an end 42 opposite the guide 36 and extends outwardly from the center of the turntable at an angle relative to a radius from the center of the turntable. A pair of conical protuberances 43 and 44 are formed at the end 42 and provide pivotal means to enable the arm and guide elements to rotate about an axis formed by the conical protuberances 43 and 44 when a 33⅓ rpm record is placed on the turntable. Should a 45 rpm record with an undersized aperture be placed on the turntable, the guides 36 will be partially depressed as the inner periphery of the aperture engages the arcuate surface 36a and partially depresses the guide and arm portion thereof. When playing records of this kind the turntable will operate normally with the guides partially depressed. The pivotal arms 40 together with their guides 36 resist extremely high forces applied radially, or substantially radially toward the pivots formed by the conical protuberances 43 and 44, while requiring an extremely low force tangentially about the pivot to cause the arms or guides to retract beneath the surface of the turntable 20. Each of the guides 36 is free to rotate about its own conical protuberances or pivots as the pivots rock in their associated sockets 43a and 44a, respectively.

To maintain the guides 36 in an upward position, spring bias means 46 are provided. Each spring is placed sufficiently close to the pivot point so that a relatively small force applied to the end of the guide 36 will cause it to move downwardly. One aspect of the present invention is that the conical sockets 43a and 44a are larger than is necessary to accommodate the conical protuberances inserted therein. Therefore, excessive radial forces along the arm will cause the conical protuberances to slide along the interior surface walls of their sockets and move radially, or substantially radially of the record. Therefore, if records of the 45 rpm type have undersized apertures or if a record is inadvertently misaligned during positioning on the turntable, the guide 36 and its associated arm will shift radially inwardly as the conical protuberances slide along the conical walls of their sockets. When the radially applied face of the record take out arm is removed, the guides will return to the center position for playing of the record.

In accordance with another aspect of this invention, the guide 36 and arm 40 have integrally formed therewith a shutter or baffle portion 47 which preferably is formed near the end, and extends downwardly, of the guide 36. The baffle 47 on each of the guide and arm elements provides means for blocking light from a light source 48 located beneath the turntable 20. A light responsive transistor 50 is responsive to the presence and absence of light as controlled by the baffles 47 to change the frequency of an oscillator circuit to control the speed of rotation of the turntable 20. Suffice it to say at this point, when the arms 40 and guides 36 are in the up position when no record or when a 45 rpm record is placed in position on the turntable, the light source 48 energizes the light responsive transistor 50 to cause the control circuit operating the drive motor 28 to rotate the turntable 20 at 45 rpm. However, when a 33⅓ rpm record is placed on the turntable, guides 36 and arms 40 are depressed, as seen in phantom line in FIG. 3, and the baffle or shutter elements 47 block off the light from light source 48. Therefore, the phototransistor 50 will produce a change in its output signal to change the output frequency of an oscillator and rotate the turntable at 33⅓ rpm. When the 33⅓ rpm record is removed, arms 40 and guides 36 are biased upwardly by the springs 46 and the light source 48 again energizes the phototransistor 50 to increase the speed of the motor and again rotate the turntable at 45 rpm.

One aspect of the invention with regard to the baffle or shutter elements 47 is that they are arranged to require all three guides 36 to be depressed to block off sufficient light from the light source to the light responsive transistor 50. This eliminates the possibility of erroneously blocking off the light by one of the baffles should its associated guide become depressed during placing a 45 rpm record on the turntable. In the illustrated embodiment the circuitry associated with the light responsive transistor is so adjusted that the amount of light received from the light source must drop below 75 percent of the total light before the transistor will cause the speed of rotation of the turntable to change to 33⅓ rpm.

Preferably, the drive motor 28 is a synchronous motor which will operate at 300 rpm with a 60 hertz signal applied thereto. The synchronous drive motor 28 is coupled to the turntable by the belt 30 without the use of an idler wheel. Furthermore, the synchronous drive motor 28 will operate at relatively low power consumption at synchronous speeds thereby providing a more efficient turntable drive configuration. The use of a synchronous drive motor eliminates the need of expensive and complicated drive pulleys and/or drive wheels as is now commonly the practice in the art. Furthermore, by utilizing the light source 28 and light responsive transistor 50 to provide electronic switching for changing the speed of rotation of the turntable, a more reliable structure is provided. For example, the synchronously driven turntable meets the present "wow" and "flutter" specification of 0.5 percent. In fact, the measured "wow" of the present invention was on the order of about 0.25 percent and the "wow" and "flutter" combined was on the order of about 0.045 percent. The pulley 30 may be a plastic pulley if desired.

In the illustrated embodiment, the motor 28 is a 24 pole synchronous motor. The effect of transition between poles on "wow" and "flutter" is minimized by the present invention by providing circuit means to energize the motor at high voltage during initial start-up and thereafter energize the motor at a reduced voltage during normal running speed. This eliminates and reduces the "cogging" effect common in synchronous motors of this type.

Referring specifically to FIGS. 5, 6 and 7 the details of construction of the guide and arm elements are illustrated. Here the units are formed of a single molded structure of material such as talc filled polypropylene, with a 40 percent talc, or equivalent filler material. The molded units are formed to have a wall thickness in the order of about 1/16 of an inch generally with all draft angles on the order of about one degree for separating from the mold. All corners and fillets have radii of approximately 1/32 of an inch. Most advantageously, the guide portions 36 are solid at their upper ends 36b and hollow in the middle and lower ends as illustrated at reference numeral 36c. This hollow configuration of the guides enables a small amount of flexing in direction of the arrowed line 51 to enable the guides collectively to compress somewhat for records having undersized center holes. The end portion 42 of the structure has a flange 52 with a spring retaining portion 53 formed integral therewith. Therefore the spring 46 of FIG. 3 can be held in a fixed position relative to the arm 40 and the guide 36. In the illustrated embodiment the conical protuberances 43 and 44 are substantially identical in configuration and may extend approximately 0.18 inches above the surface of the arm and have an upper radius of approximately 0.015 inches.

Figure 8:
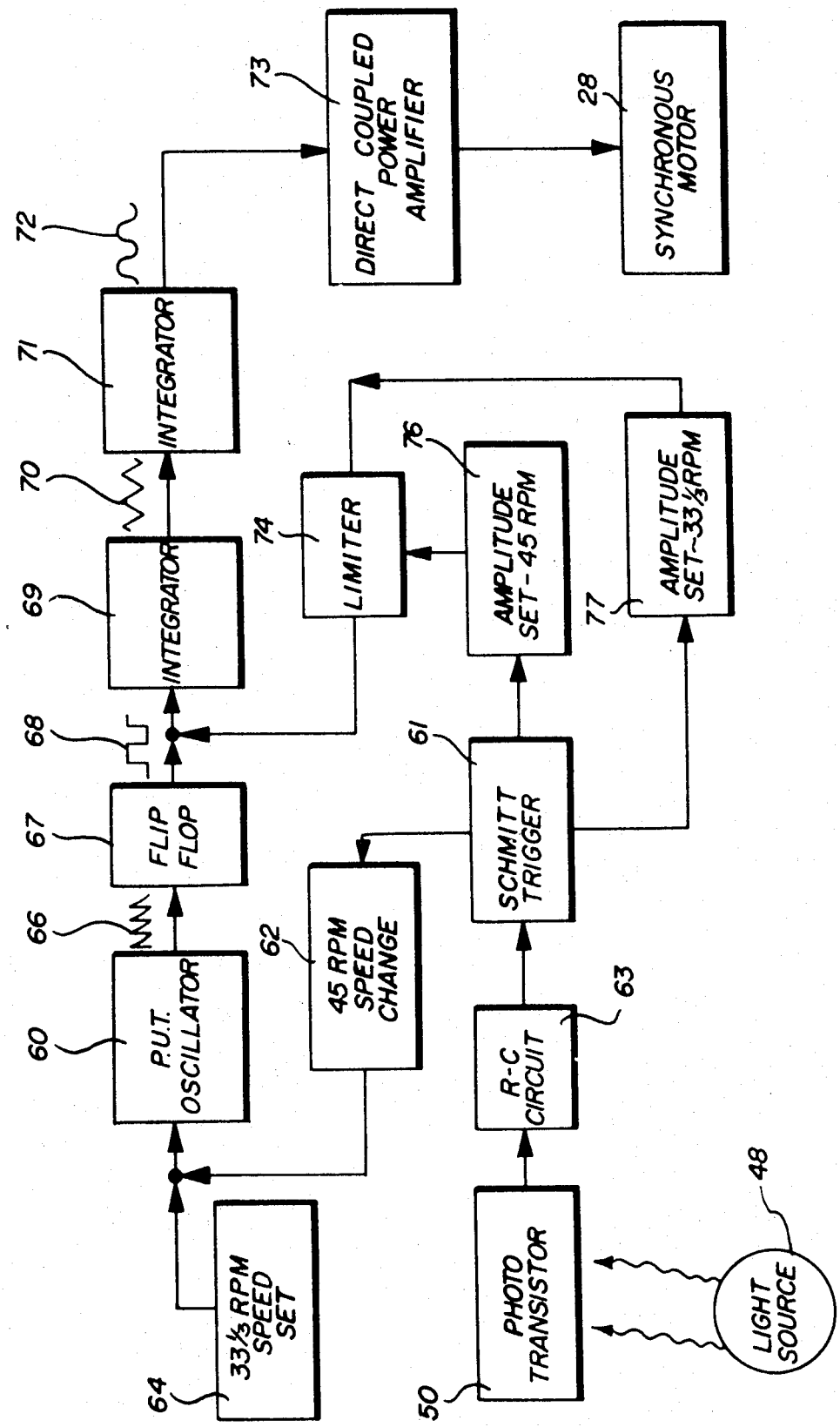
FIG. 8 is a simplified block diagram of the circuit arrangement utilized in the two-speed record player of this invention.

Referring now to FIG. 8 there is seen a simplified block diagram of the control circuit utilized to operate the automatic two-speed turntable of this invention. Here a programmable uni-junction transistor oscillator circuit 60 is provided to continuously oscillate at a frequency which will provide 45 rpm from the turntable. The frequency programmable uni-junction transistor oscillator circuit 60 is varied by a Schmitt trigger 61 through a speed-setting or speed-range circuit 62. When a 33⅓ rpm record is placed on the turntable guides 36 are depressed to cause the shutter elements 47 to block light from between the light source 50 and the photocell 48. As mentioned above all three shutter elements 47 must be down to cause the phototransistor 48 to be effective. This condition is sensed by a resistor capacitor charging network, designated by reference numeral 63, and determines the response time necessary to reach a level for activation of the Schmitt trigger 61. This will cause speed control circuit 64 to be rendered independent of circuit 62 and vary the frequency of oscillation of the programmable uni-junction transistor oscillator 60. This will rotate the turntable at 33⅓ rpm. The shape of the output signal of oscillator 60 is illustrated by reference numeral 66 and is somewhat saw-tooth in configuration.

To provide the synchronous motor 28 with the desired sine wave shape 72 the saw-tooth signals 60 are delivered through a flip-flop circuit 67 which forms symmetrical square waves 68. These square waves are applied to a first integrator circuit 69 which forms triangular waves designated generally by reference numerals 70. These triangular waves are again integrated by the integrator circuit 71 which forms sine waves 72. These sine waves 72 are amplified and delivered to the synchronous motor 28 by means of a direct coupled power amplifier arrangement designated generally by reference numeral 73.

In accordance with another aspect of this invention the starting voltage of the synchronous motor is high to provide the substantial starting torque. However, after the motor is up to speed the running voltage applied thereto is reduced by means of a limiter circuit 74 which, in turn, is controlled by either one of a pair of amplitude control circuits 76 and 77 depending on which speed is being utilized. In the illustrated embodiment it was found that only 0.25 inch ounces of torque was required to drive the turntable after it was running. However, the requirements for start-up was on the order of about 3 inch ounces. The extra power consumed during normal running, at normal starting voltages, is dissipated by mechanical vibration and heat and produces a less desirable turntable configuration. It was discovered that after start-up lowering of the voltage applied to the synchronous motor to approximately 17.5 volts, from a normal operating start-up voltage of 24 volts, would reduce the cogging and vibration which was otherwise experienced. Improvement of operation of the synchronous motor was further enhanced by use of the second integrator circuit 71 which ultimately applies a sine wave signal to the synchronous motor and insures smooth transition from pole positions and also reduces the "cogging" effect.

In accordance with this invention the light from the light source 48 is interrupted, to charge an RC circuit by deactivating the phototransistor 50. The RC circuit 63 will charge to the trigger point of the Schmitt trigger 61 which, as mentioned above, will change the frequency of oscillation of the programmable uni-junction transistor oscillator circuit 60. The point at which the Schmitt trigger is responsive to interference of light transmitted to the phototransistor 50 was selected so that two of the guides 36, together with the baffle or shutter elements 47 could be in the down position before a speed change to 33⅓ rpm would be effective. Therefore, to accomplish this the RC charging circuit has a duty cycle which is greater than 75 percent before a sufficient charge is accumulated to activate the Schmitt trigger 61. However if all three pilot arms and shutters 47 are depressed the light to the phototransistor 50 is substantially blocked and a speed change will occur within a few seconds. The time to accomplish the speed change is less than the time between the depression of the pilot arms and placing of the tone arm on the record. Therefore no distrotion will be noticed when playing a 33⅓ rpm record.

Figure 9:
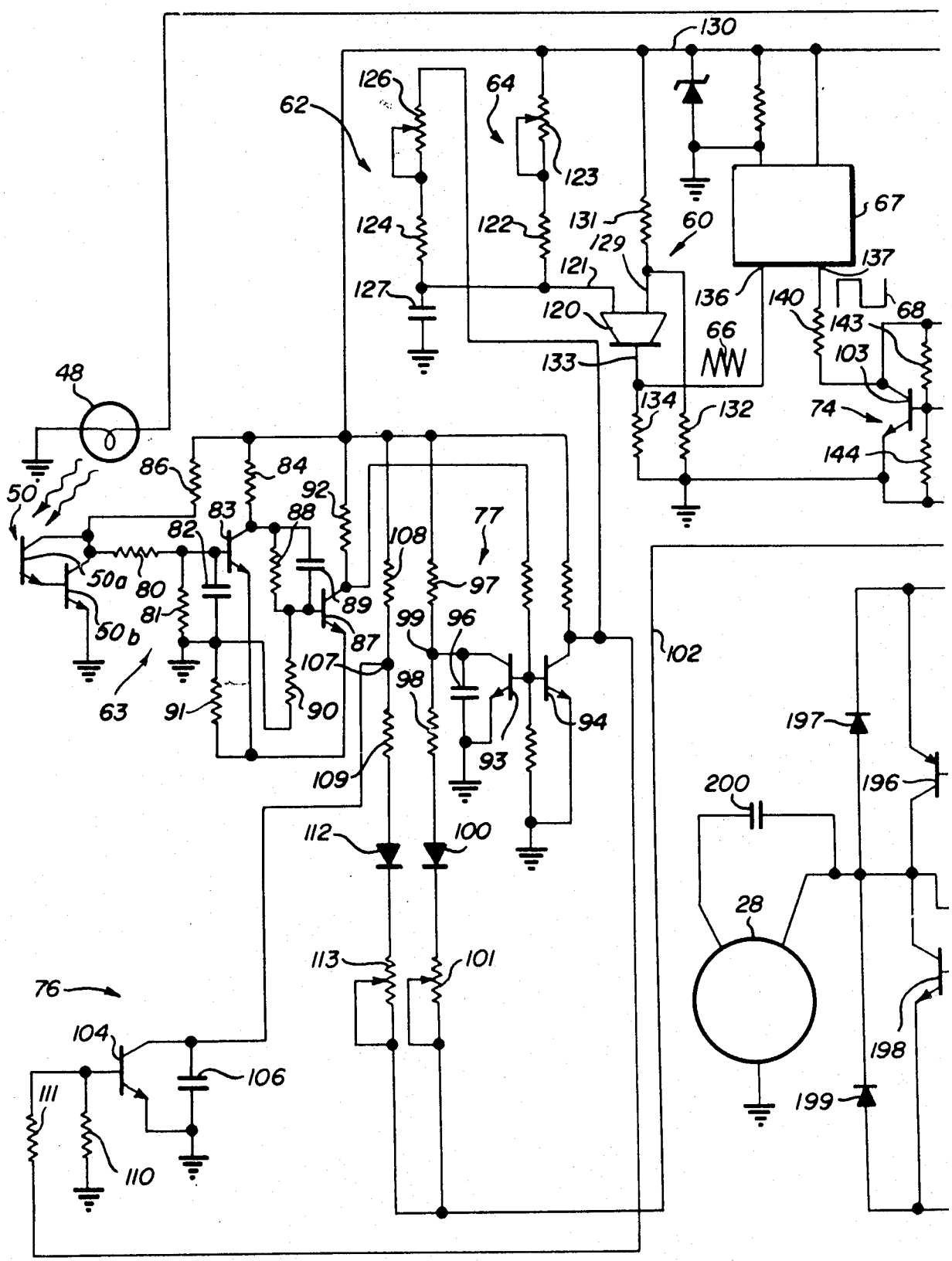
FIG. 9 is a detailed schematic diagram of the circuit arrangement of this invention.

For a better understanding of the detailed circuitry of the present invention reference is now made to FIG. 9 which is a schematic of the block diagram shown in FIG. 8. The schematic diagram of FIG. 9 illustrates the phototransistor 50 as being a coupled pair of transistors 50a and 50b which have the standard designation MRD14B. This phototransistor provides a current shunt path for the RC charging circuit 63 through a coupling resistor 80. The RC circuit 63 comprises a resistor 81 connected in parallel with a capacitor 82. RC circuit 63 is coupled to the base electrode of a transistor 83 which forms the input transistor of the Schmitt trigger 61. Transistor 83 receives operating voltage through a load resistor 84 while the phototransistor 50 receives operating voltage through a resistor 86. The output of transistor 83 is coupled to the base electrode of a second transistor 87 through a parallel network comprising resistor 88 and capacitor 89. The base electrode of transistor 87 is also coupled back to ground potential through a resistor 90 while the emitter electrode of transistor 87 is coupled to ground potential through a resistor 91. The output signal from transistor 87 is developed across a load resistor 92 and coupled to the base electrodes of a pair of back-to-back transistors 93 and 94 through a resistor. Transistor 93 forms part of the amplitude set circuit 77 for increasing the voltage applied to the motor during initial start-up when a 45 rpm record is to be played. The circuit transistor 94 will also be used to decrease current to the oscillator for rapidly decreasing the rpm from 45 rpm to 33⅓ rpm.

Figure 10:
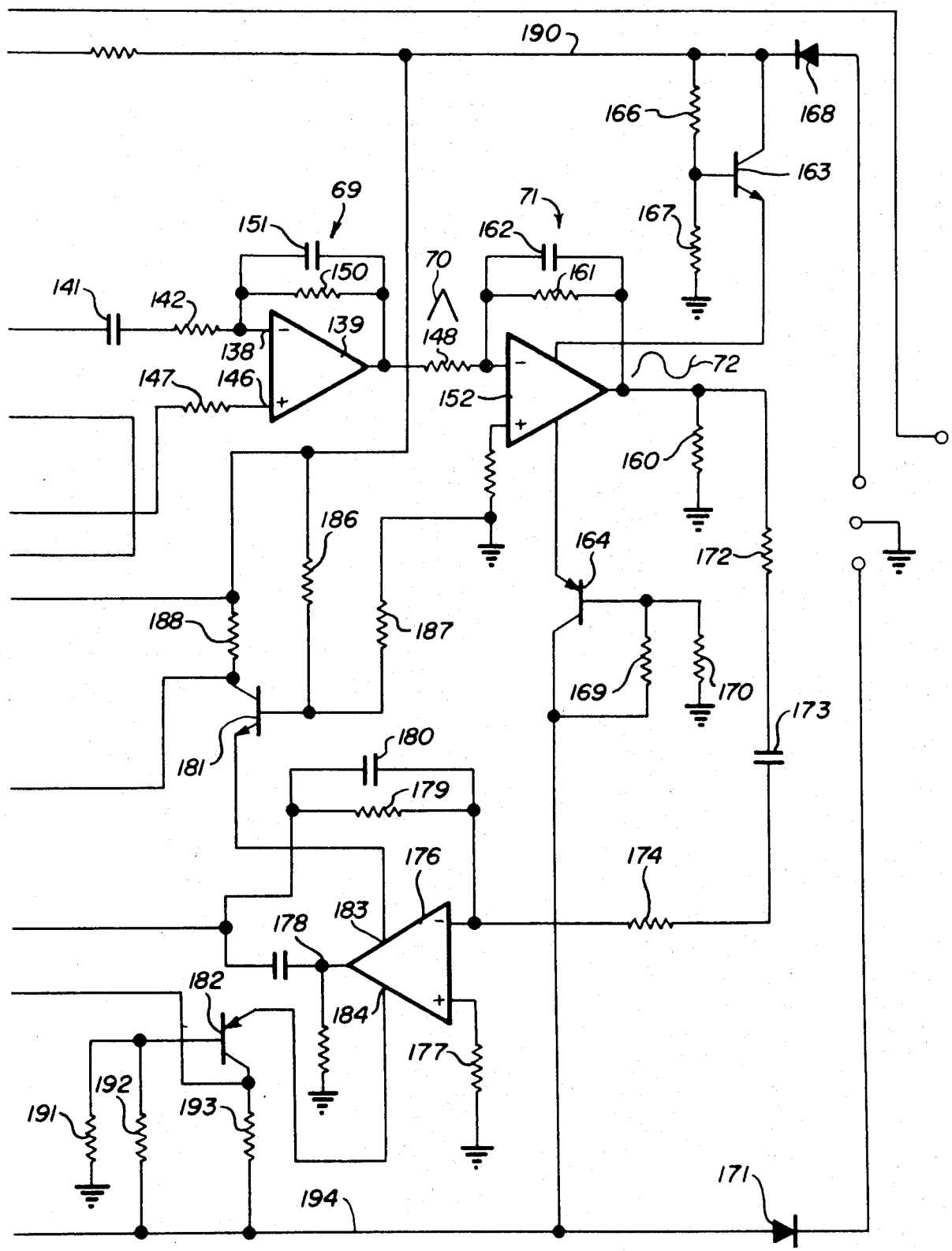

The transistor 93 shunts a charging capacitor 96 which, in turn, is coupled between a pair of voltage divider resistors 97 and 98. The signal at a terminal point 99 between resistors 97 and 98 is coupled through resistor 98 and a diode 100 and through a series coupled potentiometer 101 over a line 102 (see also FIG. 10) to the base electrode of a transistor 103. Transistor 103, together with its associated circuitry, forms the limiter circuit 74. A transistor 104 has the collector emitter electrodes thereof coupled across a capacitor 106 which is connected to a circuit point 107 between a pair of resistors 108 and 109. The transistor 104 is biased by a resistor 110 coupled to ground potential and by a signal from the output of transistor 94 through a resistor 111. During initial start up of the phonograph, the synchronous motor 28 receives full voltage operating signals. However, after the motor has reached proper operating speed, transistor 103 is rendered conductive to chop a portion of the square wave signal received from the flip-flop circuit 67 thereby reducing the overall amplitude of these signals developed in the circuit. As mentioned above, favorable results were obtained by reducing the 24 volts normally required for start-up to approximately 17½ volts during running. The signal at terminal point 107 is coupled to resistor 109, a series connected diode 112, a potentiometer 113 and then through the line 102 to the base electrode of transistor 103. The two trigger signals required to operate the limiting circuit 74 compensate for power requirements as a result of changes in frequency applied to the synchronous motor. The output signal from terminal point 99 through diode 100 is responsive to sensing a 45 rpm record being placed on the turntable while the output signal from terminal point 107 through diode 112 would be responsive to a 33⅓ rpm record being placed on the turntable.

The programmable unijunction transistor oscillator circuit 60 comprises a programmable unijunction transistor 120 having an anode electrode 121 thereof coupled to a variable resistance network comprising resistors 122 and 123. Resistor 123 is on the order of about 100 K ohms and is used to adjust the frequency of oscillation for 33⅓ rpm records. The electrode 121 is also coupled to a variable resistance network comprising resistors 124 and 126. Resistor 126 is on the order of about 1 meg ohm and is used to adjust the frequency of oscillation for 45 rpm records. A capacitor 127 is coupled to the anode electrode and the rate of charge of the capacitor as controlled by the two variable resistance charge paths determines the frequency of operation of the programmable unijunction transistor oscillator circuit. A gate electrode 129 is coupled to a regulated voltage line 130 through a resistor 131. The gate electrode is also coupled to ground potential through a resistor 132. A cathode electrode 133 is coupled to ground potential through a resistor 134. The saw tooth signals 66, FIG. 7, are applied an input to terminal 136 of the flip-flop ciruclt 67. The flip-flop circuit 67 is here illustrated as an integrated circuit chip and is commercially available under the designation MFC4040. The output of the flip-flop circuit 67 is developed at a terminal 137 and applied to an input terminal 138 of an operational amplifier circuit 139 (FIG. 18). This signal is coupled through a resistor 140, capacitor 141 and resistor 142. It can be seen that the limiting circuit 74 will shunt a portion of the square wave signal from resistor 140 to ground potential when the appropriate running speed is reached. In the illustrated embodiment, transistor 103 is biased by a pair of resistors 143 and 144 in conjunction with resistor 140 in such a manner that the collector and emitter electrodes thereof shunt a portion of the square wave signal coupled to the IC amplifier 139. A second input terminal 146 of IC amplifier 139 is coupled to ground potential through a resistor 147. The output of operational amplifier 139 is the triangle wave 70 and is developed across a coupling resistor 148. The operational amlplifier 139 has the output thereof coupled back to the input through a parallel resistor capacitor network comprising resistor 150 and capacitor 151.

The second state of integration of the signal required for operating the synchronous motor 28 is accomplished by a second integrator circuit including operational amplifier 152. Operational amplifier 152 together with operational amplifier 139 may be formed on a single integrated circuit chip as is well known in the art, and is commercially available under standard designation 1458.

The output of the operational amplifier 152 is developed across a resistor 160 and applied back to the input thereof through a parallel network comprising a resistor 161 and capacitor 162. The operational amplifier 152 together with its associated components form the second integrator circuit 71 and the output of which is a sine wave as indicated by the wave shape 72. The operational amplifier 152 receives operating voltage from transistors 163 and 164. The transistor 163 has the base electrode coupled to a junction point between a pair of resistors 166 and 167. The collector electrode of transistor 163 is coupled to the cathode of the diode 168. The diode 168 is connected to the positive terminal of a 34 volt DC power supply. On the other hand, transistor 164 has the base electrode thereof connected between resistors 169 and 179 with the collector electrode connected to the anode of a diode 171. The cathode of diode 171 is connected to the negative terminal of a 34 volt DC power supply. Diodes 168 and 171 provide means for preventing reverse current flow through the circuit.

The sine wave signal 72 is then applied through a series network comprising resistor 172, capacitor 173 and resistor 174, to the input terminal of an operational amplifier circuit 176. This operational amplifier is part of an IC chip commercially available under No. 741. The operational amplifier circuit 176 has a second input thereof connected to ground potential through a resistor 177. The output terminal 178 of the operational amplifier 176 is coupled back to the input terminal thereof through a parallel network comprising resistor 179 and capacitor 180. A pair of transistors 181 and 182 are connected to supply voltage input terminals 183 and 184 respectively, of the operational amplifier 176, this coupling being a direct current coupling at the emitter electrodes of the transistors. The base electrode of transistor 181 is coupled to a circuit point between a pair of resistors 186 and 187 while the collector electrode thereof is coupled to a resistor 188 to a positive DC line 190. On the other hand, the base electrode of transistor 182 is coupled to the junction between resistors 191 and 192 while the collector electrode is coupled through a resistor 193 to a negative DC line 194. The output signal at the collector of transistor 181 is coupled to the base electrode of a driving transistor 196 (FIG. 9) which has the emitter and collector electrodes thereof shunted by a diode 197. The output signal from the collector of transistor 182 is coupled to the base electrode of transistor 198 which has its emitter and collector electrodes shunted by a diode 199. The diodes 197 and 198 function as bi-directional current flow paths for applying AC signals to the synchronous motor 28. In the illustrated embodiment, the synchronous motor 28 is of the capacitor start type and has a starting capacitor 200 connected across the input terminals thereof. The power amplifier configuration of FIG. 9 comprises the operational amplifier circuit 176, transistors 181 and 182 together with power drive transistors 196 and 198.

What has been described is a simple and efficient automatic two-speed phonograph system which, for example, enables two-speed operation for playing 45 and 33⅓ rpm records without requiring complex mechanical belts and pulleys to effect speed changes. While a single specific embodiment of the present invention has been illustrated herein, it will be understood that variations and modifications may be incorporated without departing from the spirit and scope set forth in the following claims.

The invention is claimed as follows:

1. In a two-speed automatic phonograph, the combination comprising: a turntable with a plurality of holes therein to receive disc records of different types having relatively large and relatively small record holes respectively to be played at first and second speeds respectively, record hole size sensing means comprising a plurality of separate independently movable elements projecting through said holes and cooperable with a record on said turntable to sense the center hole size thereof, drive means coupled to said turntable for driving said turntable either at said first speed or at said second speed depending on the record hole size sensed by said sensing means, and speed control means responsive to said sensing means and coupled to said drive means for turning said turntable at operating playing speed for the type of record placed thereon, and fixed detecting means coupled with said speed control means and coacting with said elements sequentially and requiring positional coincidence of a plurality of said elements to effect speed control.

2. In a two-speed automatic phonograph as set forth in claim 1 wherein said drive means comprises a synchronous motor, and wherein said electronic speed control means comprises a programmable unijunction transistor relaxation oscillator generating a saw tooth wave, means for converting said saw tooth wave to a sine wave, and means connecting the converting means to said synchronous motor.

3. In a two-speed automatic phonograph as set forth in claim 2 wherein said converting means comprises a flip flop connected to said oscillator to produce a rectangular wave, and two integrating stages to convert said rectangular wave substantially to a sine wave.

4. In a two-speed automatic phonograph as set forth in claim 3 and further including means for controlling the amplitude of said rectangular wave and thereby to control the magnitude of the voltage applied to said motor, a higher voltage being applied at start up than during running condition.

5. In a two-speed automatic phonograph as set forth in claim 1 wherein said sensing means comprising non-contacting electronic sensing means.

6. In a two-speed automatic phonograph as set forth in claim 5 wherein said electronic sensing means comprises a photo sensitive device and a light supplying light thereto, and wherein said sensing elements respectively block light from said photosensitive means or permit light to reach said photosensitive means freely in accordance with which of the record characteristics is sensed.

7. In a two-speed automatic phonograph as set forth in claim 1, wherein said sensing means comprises a plurality of arms pivoted on said turntable and each having an upward projection near the center of and projecting through a hole in said turntable for detecting the relative size of the center hole of a record placed thereon, each of said arms being pivotally mounted by means of a conical protuberance thereon inserted into a conical seat on the underside of said turntable and pivotally held therein by spring bias means acting between said turntable and said arm.

* * * * *